United States Patent [19]

Taka

[11] Patent Number: 5,148,011

[45] Date of Patent: Sep. 15, 1992

[54] DISTANCE MEASURING APPARATUS USING INTEGRATION OF REFLECTED LIGHT AND OBTAINING A PLURALITY OF DISTANCE SIGNALS

[75] Inventor: Hideo Taka, Yokohama, Japan

[73] Assignee: Canon Kabushiki Kaisha, Tokyo, Japan

[21] Appl. No.: 591,755

[22] Filed: Oct. 2, 1990

[30] Foreign Application Priority Data

Oct. 3, 1989 [JP] Japan .................................. 1-257164

[51] Int. Cl.$^5$ ............................ G03B 3/00; G01C 3/00
[52] U.S. Cl. ................................. 250/201.6; 354/403; 356/1
[58] Field of Search ................. 250/201.4, 201.6, 561; 354/403; 356/1, 4

[56] References Cited

U.S. PATENT DOCUMENTS

| | | | |
|---|---|---|---|
| 4,723,073 | 2/1988 | Amikura et al. | 250/201.4 |
| 4,755,662 | 7/1988 | Fujiwra et al. | 250/201.4 |
| 4,855,585 | 8/1989 | Nonaka | 354/403 |
| 4,967,223 | 10/1990 | Suzuki | 354/403 |
| 4,977,457 | 12/1990 | Tamekuni et al. | 250/201.4 |

*Primary Examiner*—David C. Nelms
*Assistant Examiner*—Michael Messinger
*Attorney, Agent, or Firm*—Fitzpatrick, Cella, Harper & Scinto

[57] ABSTRACT

In a distance measuring apparatus of the type which measures the distance to an object by projecting a distance measurement light to the object, receiving the reflection of the light thus projected, and integrating a light reception signal corresponding to the reflection thus received, the following devices are provided: an integration device for performing the above integration; a judging device for making a judgment as to whether accuracy in distance measurement can be provided on the basis of the integration output from the integration device for a predetermined time; and a distance information forming device for forming distance information, when the above-mentioned judging device concludes that accuracy in distance measurement cannot be provided, on the basis of the intergration output from the integration device for the predetermined time.

8 Claims, 10 Drawing Sheets

DISTANCE MEASURING APPARATUS USING INTEGRATION OF REFLECTED LIGHT AND OBTAINING A PLURALITY OF DISTANCE SIGNALS

BACKGROUND OF THE INVENTION

1. Field of the Invention

The present invention relates to a distance measuring apparatus of the so-called active system type, which is equipped with a light emission means and a light reception means and which is adapted to perform distance measurement by means of a light reflected from the object of the measurement.

2. Description of the Related Art

FIG. 10 shows the circuit configuration of a conventional distance measuring apparatus of the active system type. Here, it will be assumed that the apparatus is arranged in a camera.

The apparatus shown includes: a control circuit 101 adapted to output a timing pulse, which will be described below, and receive the outputs from comparators, thereby performing distance measurement calculations; a drive circuit 102 adapted to receive the timing pulse outputted from the control circuit 101 and drive a light emission means, which will be described below; a light emission means 103, which consists of an infrared emission diode, etc. and which projects a signal light (a distance measurement light) to the object of the distance measurement; a light reception means 104, which consists of a semiconductor position detector, etc. and which is adapted to receive the reflection from the subject, i.e., the object of the distance measurement, (the reflection of the beam of light projected from the light emission means 103), outputting signal currents IA, IB, which change in accordance with the distance to the object; a switching circuit 105 adapted to input the signal current IA, IB from the light reception means 104 and selectively output first IA, then, (IA+IB), in accordance with the signal from the control circuit 101; an amplifier 106 for amplifying the signal from the switching circuit 105; a synchronous integration circuit 107 adapted to integrate the signal from the amplifier 106 in accordance with the timing pulse, which is supplied from the control circuit 101 and which is in synchronism with the light projection timing; a comparator 108 for comparing the signal voltage V0 from the synchronous integration circuit 107 with a constant voltage V1; and a comparator 109 for comparing the above-mentioned signal voltage V0 with a constant voltage V2. The outputs from these comparators 108 and 109 are supplied to the control circuit 101.

The apparatus described above operates as follows: as shown in FIG. 11, the synchronous integration circuit 107 integrates the signal current IA, which is selected by the switching circuit 105, for a predetermined time T. As a result, the signal voltage V0 after the lapse of the predetermined time T becomes $(V1+k \cdot IA \cdot T)$, where V1 represents the constant voltage serving as the reference voltage when the integration is started and k represents the integration constant. Next, the above integration value is integrated inversely by the sum signal current (IA+IB), which is selected by the switching circuit 105, until the signal voltage V0 becomes equal to the constant voltage V1. Supposing the time needed for this inverse integration is t, the following equation holds true:

$$k \cdot IA \cdot T = K(IA+IB)t$$

Thus, the time t is determined by the distance to the subject. The control circuit 101 calculates the distance to the subject by measuring this time t while monitoring the output of the comparator 108.

When, for example, the subject is a landscape at an infinite distance, the reflection of the projection light from the light emission means is not conveyed to the light reception means 104, so that, as shown in FIG. 12, the signal voltage V0 from the synchronous integration circuit 107 after the lapse of the predetermined time T is equal to the constant voltage V1. As shown in FIG. 12, the constant voltage V2 is set to be higher than V1, and, after the lapse of the predetermined time T, the output of the comparator 109 reaches "H" level, whereby the control circuit 101 judges that the subject is at an infinite distance.

While in the above description the influence of noises has not been considered, there actually exist various kinds of noises such as element noises of the light reception means 104 and noises generated at the amplifier 106. Thus, the signal voltage V0 from the synchronous integration circuit 107 after the lapse of the predetermined time T fluctuates, as shown in FIG. 13 and FIG. 14, within the range: $\{V1+(k \cdot IA \cdot T)-VN\}$ to $(V1+(k \cdot IA \cdot T)+VN)$. Accordingly, the time t needed for attaining the condition: V0+V1 by inverse integration also fluctuates between t1 and t2, which means that accurate measurement results cannot be obtained. In the case where the subject is relatively near or its reflectance is high, VN is small with respect to $(k \cdot IA \cdot T)$, as shown in FIG. 13, so that the difference between t1 and t2 with respect to the time t is relatively small. Accordingly, any deviation in the measurement result could be compensated for by the depth of field of the photographic lens. If, however, the subject is distant or its reflectance is low, VN is large with respect to $(k \cdot IA \cdot T)$, as shown in FIG. 14, and the difference between t1 and t2 with respect to the time t is also large, so that a deviation in the measurement result cannot be compensated for by the depth of field alone, with the result that the picture taken is out of focus. To avoid this, it is necessary to set the constant voltage V2 still higher with respect to the constant voltage V1. That is, with a signal voltage V0 which becomes higher than the constant voltage V2, VN can be expected to be lower than a certain level with respect to $(k \cdot IA \cdot T)$, so that any deviation in measurement results can be compensated for by the depth of field.

Setting the constant voltage V2 still higher with respect to the constant voltage V1, however, results in a shorter measurable distance. With the recently developed zoom camera, bifocal camera, etc., it is desirable that VN be made smaller with respect to $(k \cdot IA \cdot T)$ so that distance measurement may be performed for an object which is at a distance that cannot be measured by conventional cameras. For this purpose, $(k \cdot IA \cdot T)$ might be made larger. That, however, would make it necessary to use a high-powered infrared-emission diode, a large projection lens, etc., resulting in an increased camera production cost and an increased camera size. In view of this, the value of VN itself might be made smaller. A drastic reduction of its value, however, is not expected since this noise is inevitably generated due to the physical properties of the materials whenever the circuit constant the camera requires is determined.

SUMMARY OF THE INVENTION

This invention has been made in view of the above problems. It is accordingly an object of this invention to provide a distance measuring apparatus of the type which measures the distance to an object by projecting a distance measurement light to the object, receiving the reflection of the distance measurement light thus projected, and performing integration on a light reception signal corresponding to the reflection thus received, the distance measuring apparatus comprising: an integration means for performing the above integration; a judging means for making a judgment as to whether accuracy in distance measurement can be obtained or not on the basis of the integration output from the integration means for a predetermined time; and a distance information forming means for forming, when the above-mentioned judging means judges that the above-mentioned accuracy in distance measurement cannot be obtained, distance information on the basis of the integration output from the above-mentioned integration means for a predetermined time; whereby the above problems are solved and it is made possible to enlarge the range of measurable distance without using an expensive high-powered projection element or a large projection lens which would increase the apparatus size.

The other objects of this invention will be apparent from the following description of concrete embodiments.

DETAILED DESCRIPTION OF THE PREFERRED EMBODIMENTS

Embodiments of this invention will now be described with reference to the accompanying drawings.

Figure 1:
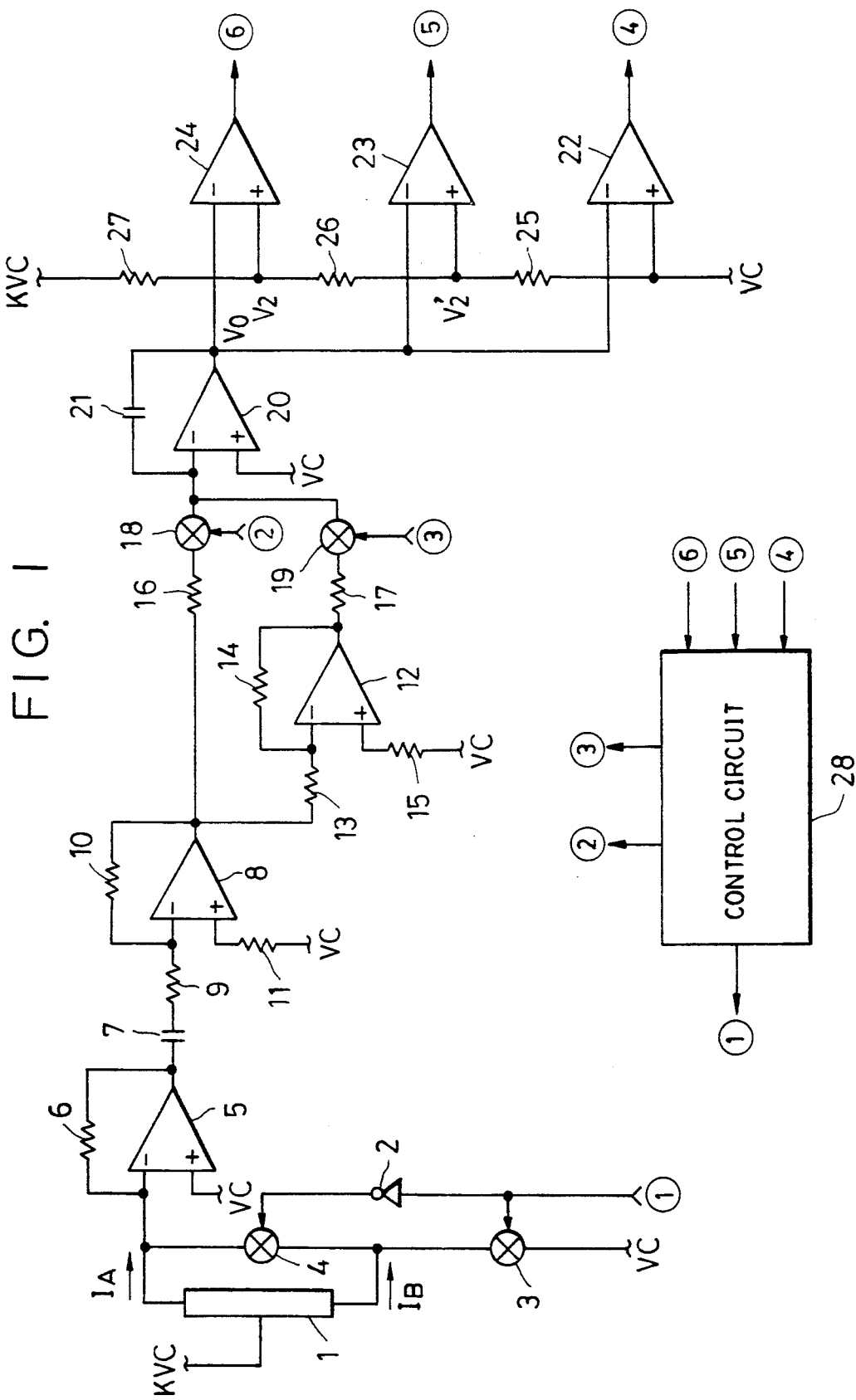
FIG. 1 is a circuit diagram showing a first embodiment of this invention.
Figure 2:
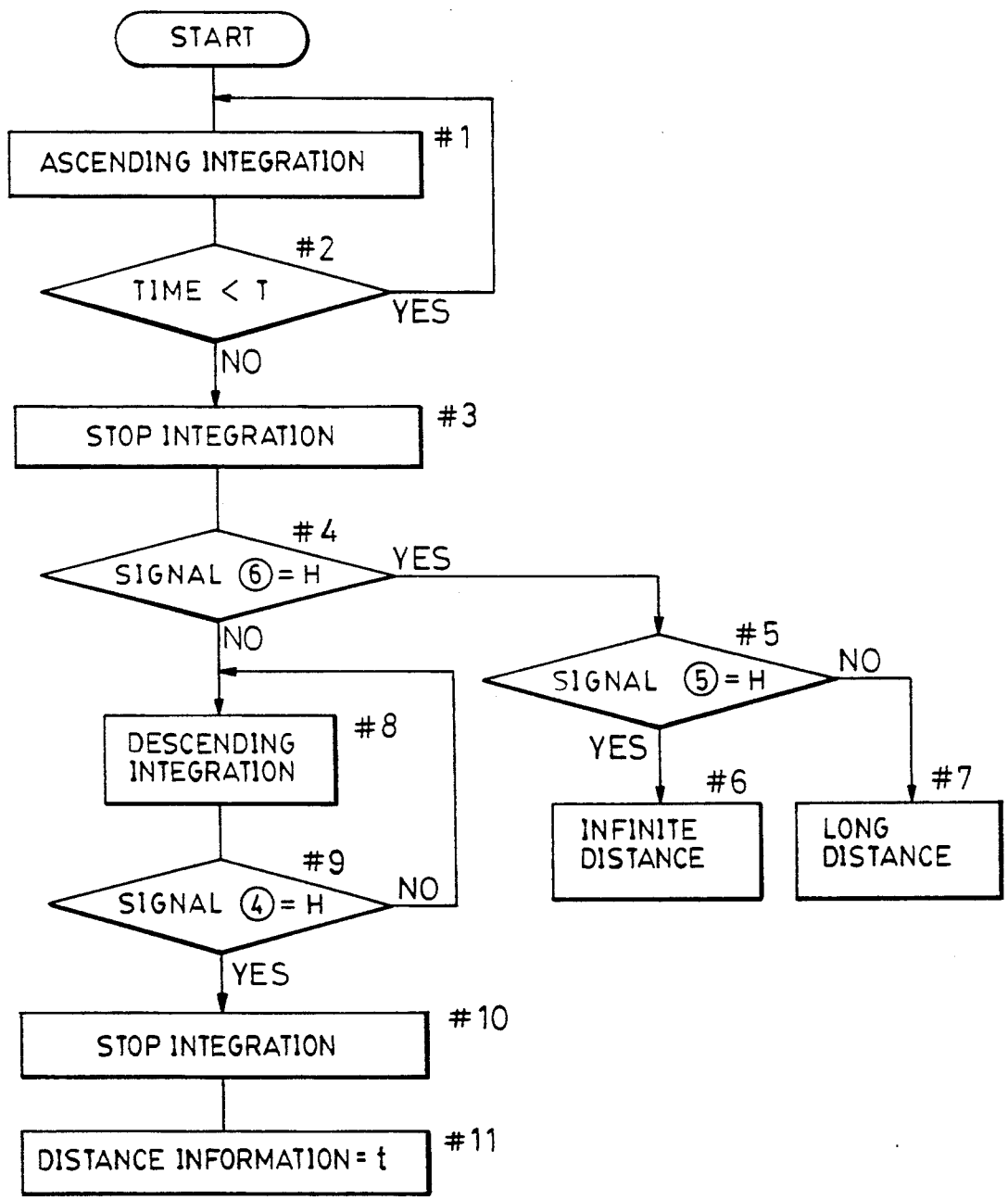
FIG. 2 is a flowchart illustrating the operation of the first embodiment.

FIG. 1 is a circuit diagram showing a first embodiment of this invention, and FIG. 2 is a flowchart illustrating the operation thereof.

The apparatus shown in FIG. 1 includes: a semiconductor position detector 1 (hereinafter referred to as "PSD"), which constitutes the light reception means; an inverter 2, to which signal ① from a control circuit 28 is to be supplied; an analog switch 3, to which the signal ① is to be supplied as a control signal; and an analog switch 4, to which the output of the inverter 2 is to be supplied. When the above signal ① is at "H" level, the switch 3 is ON and the switch 4 is OFF, with signal current IA from PSD 1 being supplied to an amplifier to be described below and signal current IB being connected to a constant voltage source VC. When the above signal ① is at "L" level, the switch 3 is OFF and the switch 4 is ON, with both signal currents IA and IB from PSD 1 being supplied to the above-mentioned amplifier. Thus, the inverter 2 and the switches 3 and 4 constitute a switching means. The reference numerals 5 and 6 respectively indicate an operation amplifier and a resistor. These components 5 and 6 constitute an amplifier that serves to transform the signal current from the above switching means into voltage.

The embodiment further includes: a capacitor 7; an operation amplifier 8; and resistors 9, 10 and 11. The components 7 to 11 constitute an AC amplifier for amplifying the output of the operation amplifier 5, which changes in accordance with the light signal of an infrared emission diode (not shown). The reference numeral 12 indicates an operation amplifier and the reference numerals 13, 14 and 15 indicate resistors. The resistance values of the resistors 13 and 14 are set equal to each other. The components 12 to 15 constitute an inversion amplifier. The reference numerals 16 and 17 indicate resistors and the reference numerals 18 and 19 indicate analog switches. They are turned ON and OFF when a signal ② or a signal ③ is supplied to them, the signals ② and ③ attaining "H" or "L" level in synchronism with the light signal period of the infrared emission diode. The reference numerals 20 and 21 indicate an operation amplifier and a capacitor, respectively. These components 20 and 21 constitute a synchronous integrator, which is adapted to integrate the output of the operation amplifier 8 or 12, which is supplied through the resistor 16 or 17 when the switch 18 or 19 is turned on. The reference numerals 22, 23 and 24 indicate comparators and the reference numerals 25 to 27 indicate voltage dividing resistors. The comparators 22, 23 and 24 respectively compare constant voltages V0, V2', V2, which are generated by the voltage dividing resistors 25 to 27, with the signal voltage V0 from the operation amplifier 20, outputting the results of the comparison to the control circuit 28 as signals ④, ⑤ and ⑥.

Figure 10:
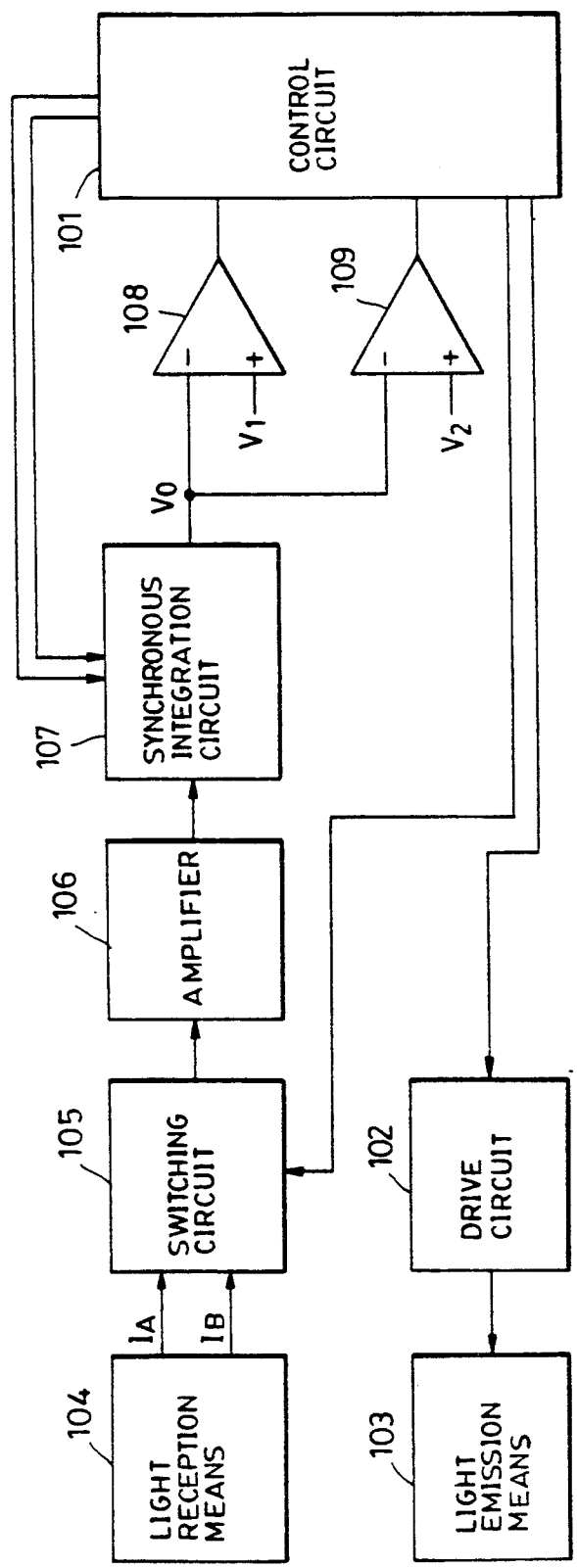
FIG. 10 is a block diagram showing the construction of a conventional distance measuring apparatus.
Figure 11:
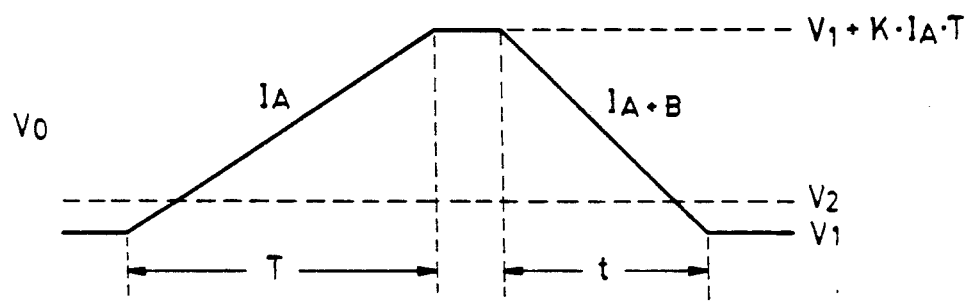
FIG. 11 is a diagram showing the ideal output waveform in the conventional apparatus when the subject is at a measurable distance.
Figure 12:
FIG. 12 is a diagram showing the waveform in the conventional apparatus when the subject is at a distance which cannot be measured.
Figure 13:
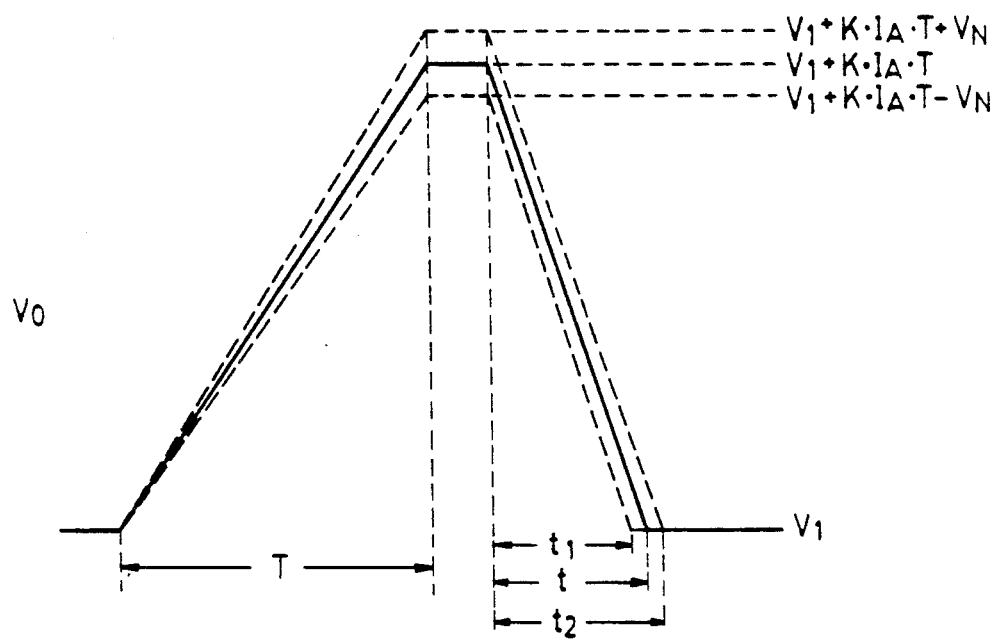
FIG. 13 is a diagram showing the waveform in the conventional apparatus when the subject is at a distance which can provide accuracy in distance measurement or when the subject has a reflectance which can provide accuracy in distance measurement.

A description of the construction of the light projection system will be omitted since it is similar to that shown in FIG. 10 (this applies to the other embodiments).

Next, the operation of this embodiment will be described with reference to the flowchart of FIG. 2.

When the reflection of the signal light (the distance measurement light) from the subject impinges upon the PSD 1, which is inversely biased by a constant voltage KVC-VC, signal currents IA and IB are outputted. At first, the signal ① is at "H" level, so that only signal current IA flows to the resistor 6. This current is converted into voltage and emitted as a signal on the output side of the operation amplifier 5. The signal from the operation amplifier 5 is amplified by the AC amplifier comprising operation amplifier 8 and is inverted by the inversion amplifier comprising operation amplifier 12.

When the infrared emission diode emits a light signal, the output level of the operation amplifier 5 is lowered; the output level of the operation amplifier 8 is raised and that of the operation amplifier 12 is lowered. When, in contrast, the infrared emission diode goes out, the output level of the operation amplifier 8 is lowered and that of the operation amplifier 12 is raised. Thus, when the infrared emission diode goes out, signal ② attains "H" level, and, when signal ③ attains "H" level while the diode is emitting a light signal, the capacitor 21 continues to be integrated in the ascending direction through the resistors 16 and 17 (Step 1 in FIG. 2). This operation is continued for a predetermined time T (Steps 2 and 3). Then, the control circuit 28 makes a judgment, from signals ⑤, ⑥ from the comparators 23 and 24, as to whether the subject is at an infinite distance or not (details in this regard will be given below). In the case where the subject is judged not to be at an infinite distance, signal ② attains "H" level when the infrared emission diode emits a light signal, and signal ③ attains "H" level when the diode goes out. Accordingly, the capacitor 21 is integrated inversely (Step 8). The control circuit 28 measures the time t, which elapses from the start of the inverse integration until the signal voltage V0 reaches the reference constant voltage VC, while monitoring signal ④ from the comparator 22. By thus measuring the time t, the control circuit 28 performs the distance measurement calculation (Steps 9 to 10).

Next, a detailed description will be given of the case where the result of the above process, which is made on the basis of signals ⑤, ⑥ from the comparators 23 and 24, shows that the subject is at an infinite distance.

Figure 14:
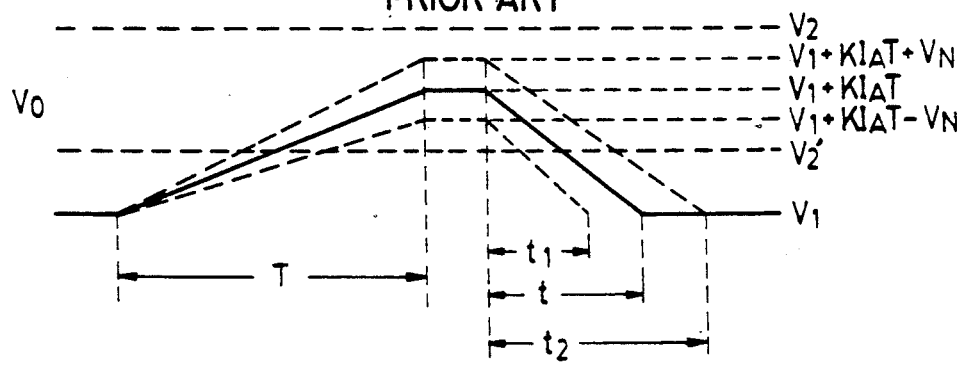
FIG. 14 is a diagram showing the waveform in the conventional apparatus when the subject is at a distance which cannot provide accuracy in distance measurement or when the the subject has a reflectance which cannot provide accuracy in distance measurement.

The voltage for infinity judgment mentioned with reference to the conventional apparatus (V2−V1 in FIG. 14), which takes the influence of noise into account, corresponds to the voltage V2−V0 at the node between the voltage dividing resistors 26 and 27 shown in FIG. 1. That is, when, after the completion of the ascending integration of the predetermined time T, signal ⑥, which is the output of the comparator 24, is at "L" level, the distance measurement errors are within the range which can be compensated for by the depth of field even if the descending integration time t fluctuates due to the influence of noise VN.

Figure 3:
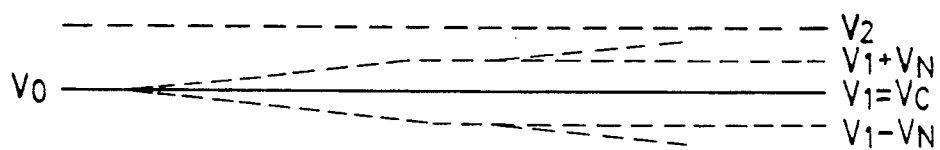
FIG. 3 is a diagram showing the output waveform when it is judged in the first embodiment that the subject is at a real infinite distance.

When, however, signal ⑥ is at "H" level, the distance measurement errors are greater, so that the control circuit 28 checks the output of the comparator 23 next. When the subject is at a real infinite distance as in the case of a landscape (which will be referred to as "infinite distance"), the signal voltage V0 after the lapse of the predetermined time T is (V1±VN), as shown in FIG. 3, so that, if the constant voltage of the comparator 23 (the voltage at the node between the voltage dividing resistors 25 and 26) is set at V2', which covers VN, signal ⑤ from the comparator 23 attains "H" level. In the case where the distance to the subject is such that large measurement errors will be involved although it is not a real infinity (which will be referred to as "long distance"), signal ⑤ is at "L" level.

This arrangement makes it possible for the judgment for controlling the photographic lens position on the infinity side, which is made on the basis of signals ⑤, ⑥ from the comparators 23 and 24, to be effected in two grades: real infinity and a long distance which cannot provide accuracy in distance measurement. In accordance with the judgment thus made, the control circuit 28 performs focusing control.

The control operation will be described in more detail with reference to FIG. 2. The control circuit 28 first makes a judgment, in Step 4, as to whether signal ⑥ is at "H" level or not. If it is judged to be at "H" level, which means the subject is at an infinite distance, the procedure moves on to Step 5, where a judgment is made as to whether signal ⑤ is at "H" level. If the judgment result is NO, the subject is judged to be at a long distance which cannot provide accuracy in distance measurement. If the judgment result is YES, the subject is judged to be at a real infinite distance.

A second embodiment of this invention will now be described with reference to the circuit diagram of FIG. 4 and the flowchart of FIG. 5, which illustrates the operation thereof.

Figure 4:
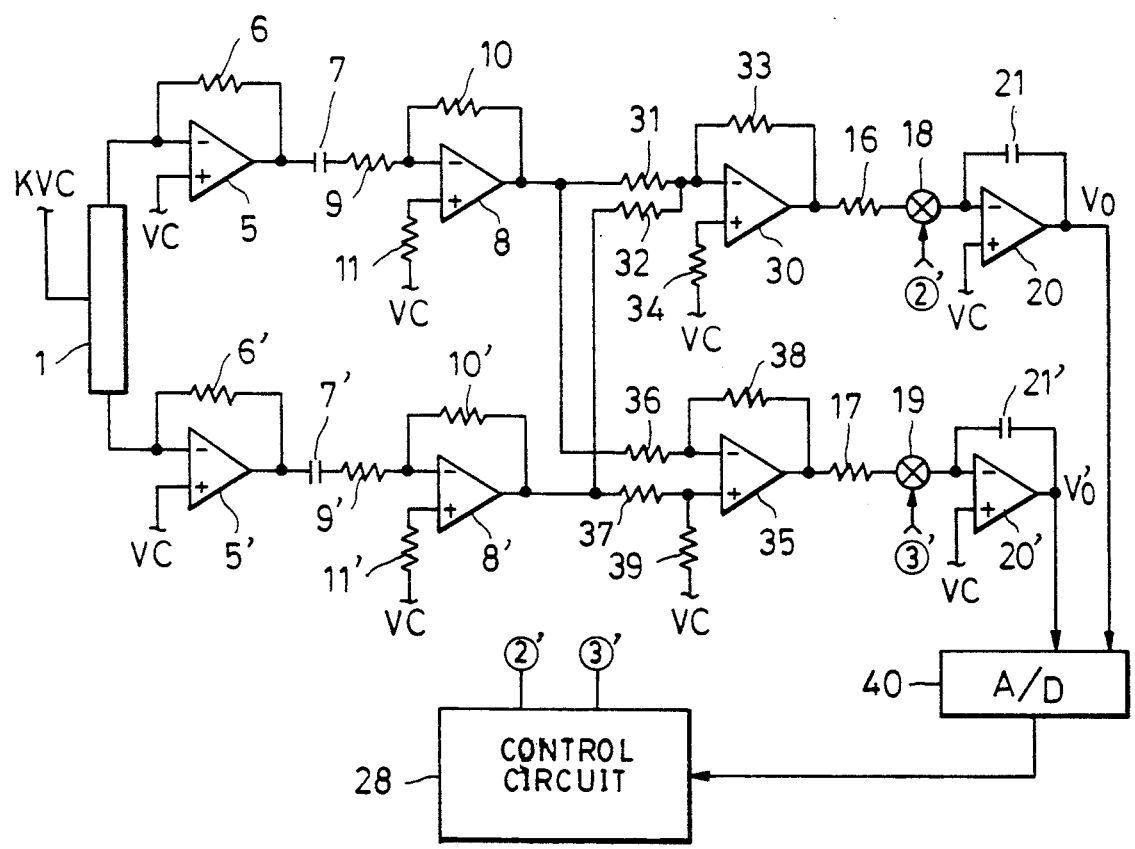
FIG. 4 is a circuit diagram showing a second embodiment of this invention.
Figure 5:
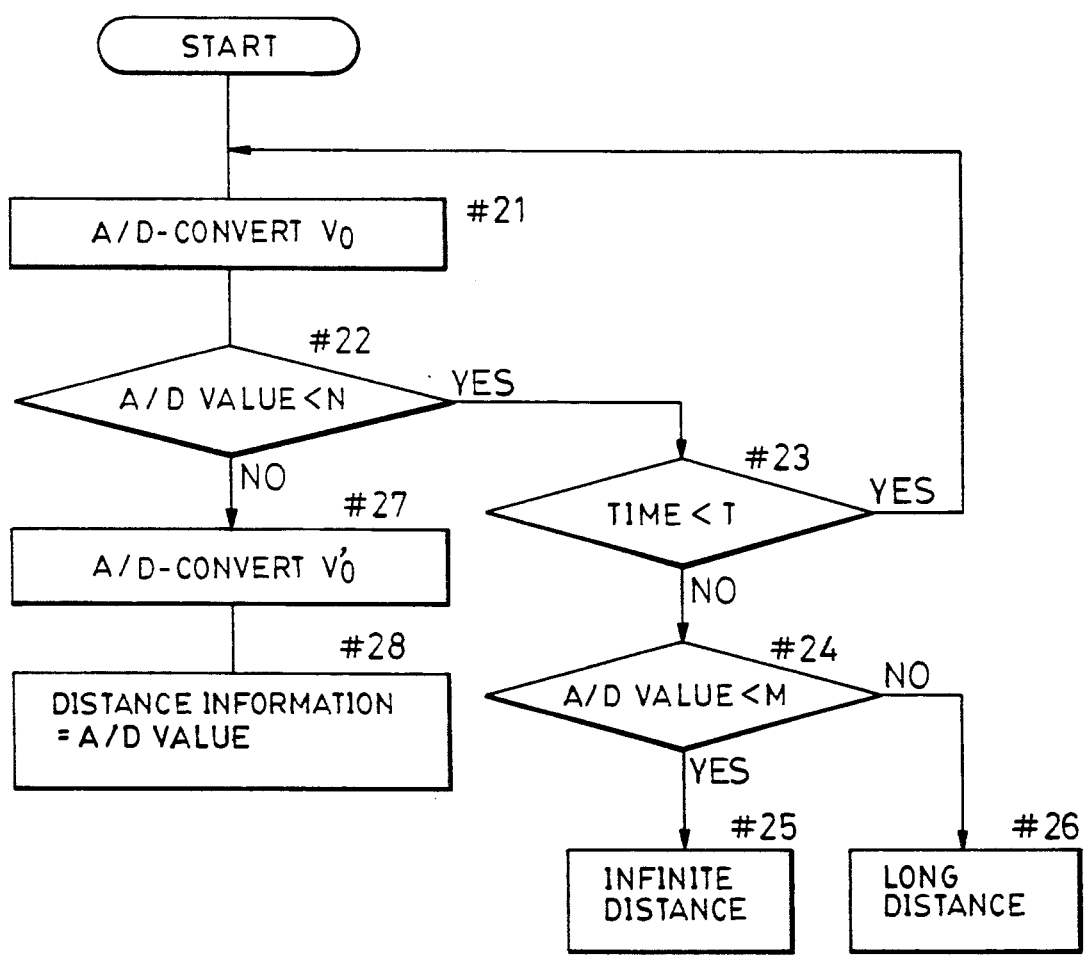
FIG. 5 is a flowchart illustrating the operation of the second embodiment.

In FIG. 4, the components which are identical with or similar to those of FIG. 1 are indicated by the same reference numerals or by ones marked with a prime.

An operation amplifier 30 and resistors 31, 32, 33, 34 constitute an adder. An operation amplifier 35 and resistors 36, 37, 38, 39 constitute a subtracter. Accordingly, the operation amplifier 20 performs integration with respect to the sum signal current (IA+IB), and the operation amplifier 20' performs integration with respect to the difference signal current (IA−IB). The reference numeral 40 indicates an A/D converter, which A/D-converts the signal voltage from the operation amplifier 20 or the signal voltage from the operation amplifier 20'.

Next, the operation of the second embodiment will be described with reference to the flowchart of FIG. 5.

Normally, distance measurement is conducted as follows: the signal voltage V0 from the operation amplifier 20 is A/D-converted while the operation amplifier 20 is performing integration on (IA+IB) and (IA−IB) (Step 21). The signal voltage from the operation amplifier 20' when the A/D-converted value thus obtained has become a predetermined value N, is to be referred to as V0'. On the basis of the A/D-converted value of this signal voltage V0', the control circuit 28 performs distance calculation.

If, however, the subject is at a long distance, it is not easy for the signal voltage V0 from the operation amplifier 20 to attain the predetermined value N. When it does not reach the predetermined value N even after the lapse of the predetermined time T (Steps 22, 23), the control circuit 28 compares the A/D-converted value of the signal voltage from the operation amplifier 20 at this time with a value M which is smaller than the predetermined value N (Step 24), thereby making it possible to make a distinction between the following two cases: (a) the distance to the subject is such as will involve errors in distance measurement but is still not considered an infinite distance; and (b) the subject is at an infinite distance as in the case of a landscape. That is, when, in Step 24, the A/D-converted value of the signal voltage V0 is judged to be smaller than the predetermined value M, the subject is judged to be at an infinite distance in Step 25, and, when the A/D-converted value of the signal voltage V0 is judged to be larger than the predetermined value M, the subject is judged to be at a long distance in Step 26.

Figure 6:
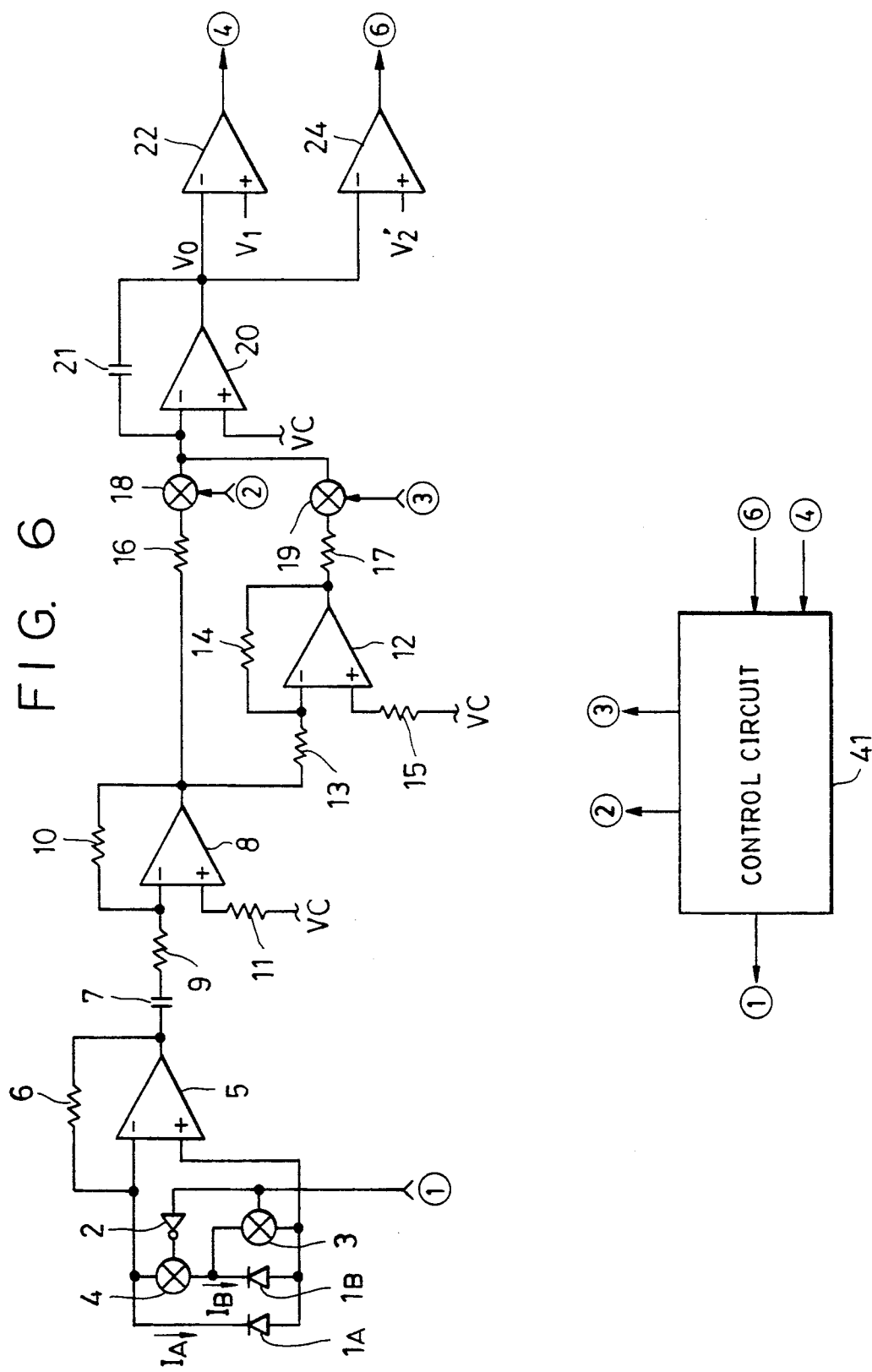
FIG. 6 is a circuit diagram showing a third embodiment of this invention.
Figure 7:
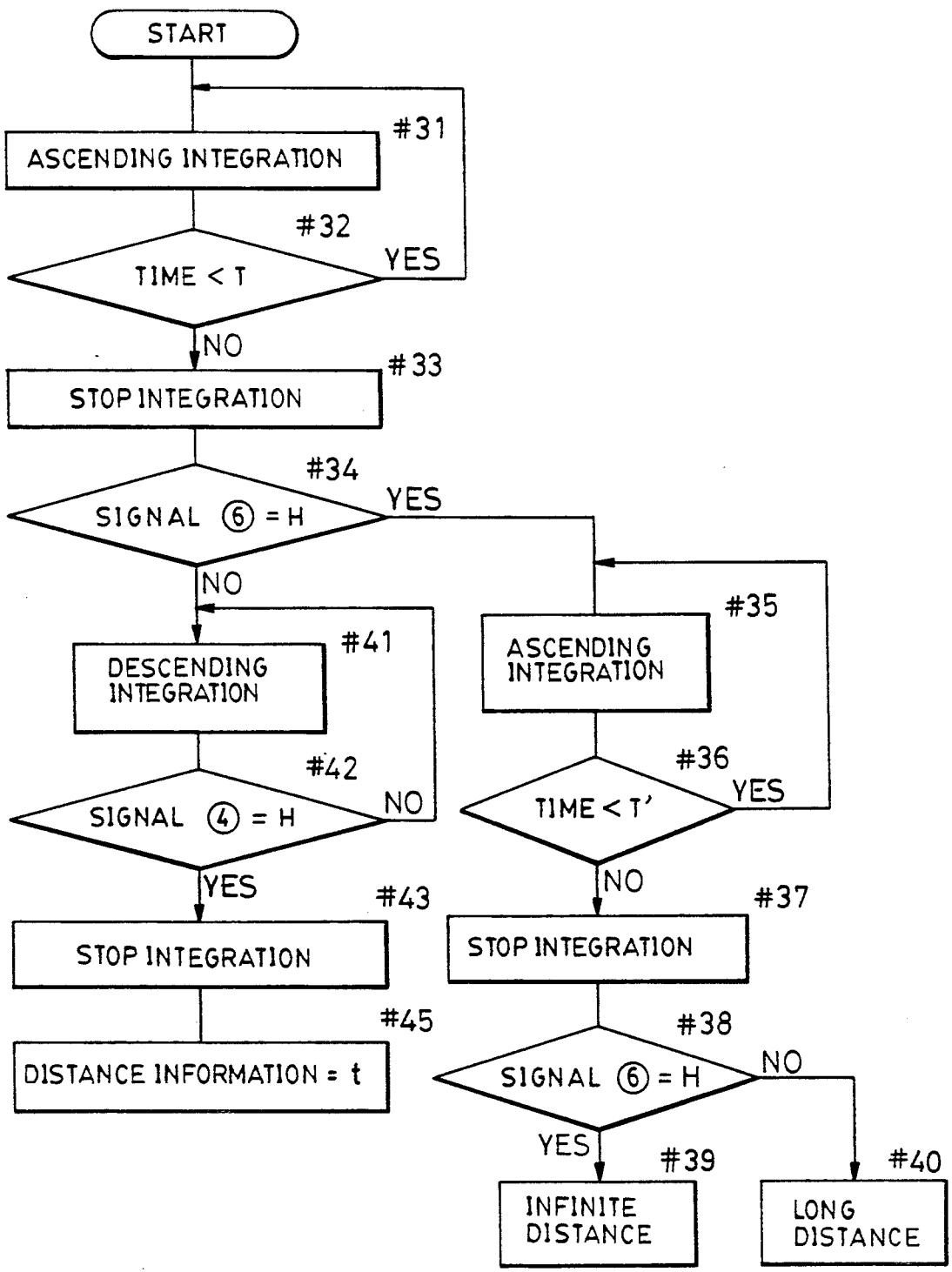
FIG. 7 is a flowchart illustrating the operation of the third embodiment.

FIG. 6 is a block diagram showing a third embodiment of this invention and FIG. 7 is a flowchart illustrating the operation thereof.

In FIG. 6, the components which are identical with or similar to those of FIG. 1 are indicated by the same reference numerals.

The reference numerals 1A and 1B indicate split photodiodes. The respective signal currents IA and IB flowing through these photodiodes change in accordance with the distance to the subject on a principle similar to that of the PSD shown in FIG. 1.

Next, the operation of this embodiment will be described with reference to the flowchart of FIG. 7.

Normally, distance measurement is conducted in the same manner as that described with reference to the embodiment described with reference to FIG. 1.

Figure 8:
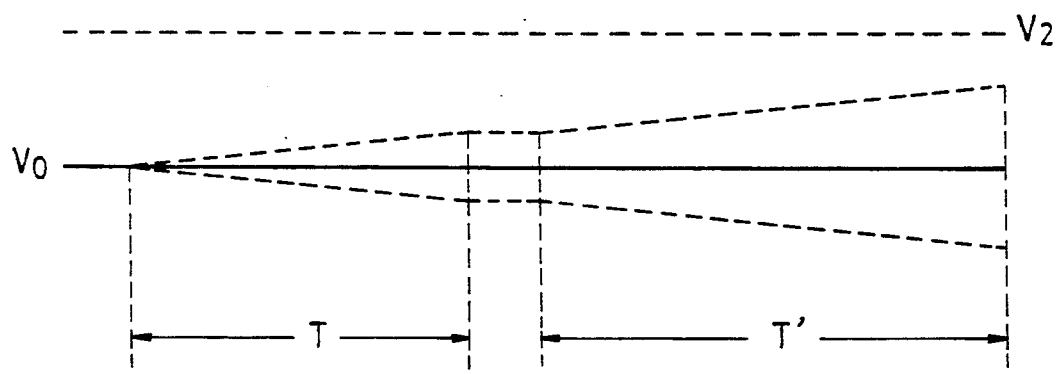
FIG. 8 is a diagram showing the output waveform when it is judged in the third embodiment that the subject is at a real infinite distance.

When the subject is at an infinite distance as in the case of a landscape, that is, when signal ⑥ is judged to be at "H" level in Step 34, the ascending integration output (V0) after the lapse of the predetermined time T is equal to or less than the constant voltage V2, as shown in FIG. 8, so that the control circuit 41 still continues to perform ascending integration for a predetermined time T40 (Steps 35, 36). Since, however, the above-mentioned integration output is equal to or less than the constant voltage V2 even after the lapse of the predetermined time T' (signal ⑥ is at "H" level), so that the operation procedure of the control circuit 41 moves on to Step 39, where the subject is judged to be at a real infinite distance.

Figure 9:
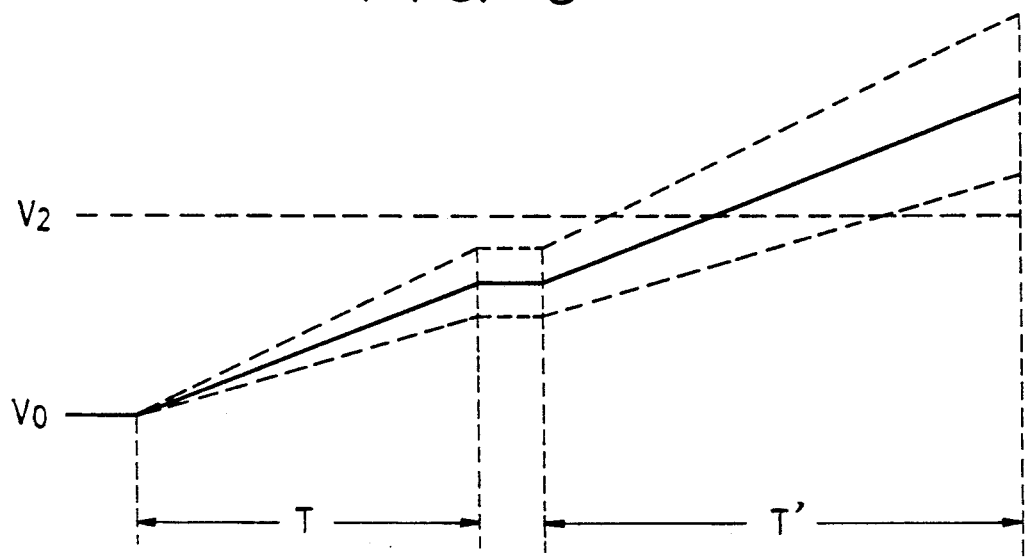
FIG. 9 is a diagram showing the output waveform when the subject is at a distance which cannot provide accuracy in distance measurement.

In the case where the distance to the subject is such as will involve errors in distance measurement but is still not considered an infinite distance, the ascending integration output (V0) after the lapse of the predetermined time T is equal to or less than the constant voltage V2, as shown in FIG. 9. Ascending integration, however, is still continued after that for the predetermined time T' with the ascending integration output becoming higher than the constant voltage V2 (signal ⑥ is at "L" level), so that the operation procedure of the control circuit 41 moves from Step 38 to Step 40, where the distance to the subject is judged not to be a real infinite distance but a long distance which cannot provide accuracy in distance measurement.

In accordance with this embodiment, a distance which cannot provide accuracy in distance measurement is divided into a plurality of grades. In other words, a distance level which has conventionally been judged to be an infinite distance is divided into the following grades on the basis of the intensity of the reflected light: (a) a real infinite distance which totally defies an accurate measurement; and (b) a long distance which can be expected to measured with accuracy to some extent. By performing focusing control with this arrangement, the measurable distance range can be increased without using an expensive high-powered infrared emission diode or a large light projection lens which would increase the apparatus size.

While in the above-described three embodiments the distance range which cannot provide accuracy in distance measurement is divided into two grades, it is also possible to divide the range into three grades or more by providing three or more comparison values of the A/D conversion results and three or more different lengths of ascending integration time.

While the first embodiment uses three comparators, it is also possible to use a single comparator, switching the reference voltage for comparison between three ways by means of a three-way switch.

While in the above embodiments the judgment as to whether accuracy in distance measurement can be provided or not is made at the time when the ascending integration terminates, it is of course possible to make this judgment at an arbitrary time.

Further, while in the above embodiments the judgment as to whether accuracy in distance measurement can be provided or not is made using the integrator for distance measurement, it is also possible to provide a separate integrator for this purpose.

What is claimed is:

1. A distance measuring apparatus of the type which measures the distance to an object by projecting a distance measurement light to the object, receiving a reflection of said distance measurement light thus projected, and performing integration on a light reception signal corresponding to the reflection thus received, said distance measuring apparatus comprising:
   (A) integration means for performing said integration on the light reception signal;
   (B) judging means for making a judgment as to whether accuracy in distance measurement can be provided on the basis of an integration output from said integration means; and
   (C) a signal forming circuit for forming a plurality of distance signals on the basis of the integration output when said judging means concludes that the accuracy in distance measurement cannot be provided.

2. A distance measuring apparatus according to claim 1, wherein said signal forming circuit forms a signal indicating an infinite distance or a long distance.

3. A distance measuring circuit according to claim 1, wherein said signal forming circuit calculates and obtains the distance through predetermined calculations on the basis of said integration output when said judging means concludes that the accuracy in distance measurement can be provided, and obtains said plurality of distance signals through a process different from said predetermined calculations when said judging means concludes that the accuracy in distance measurement cannot be provided.

4. A distance measuring apparatus according to claim 1, wherein said judging means performs said judging depending on whether the integration output reaches a predetermined level when the integration output reaches a predetermined level when the integration has been performed by said integration means for a predetermined period of time.

5. A distance measuring apparatus according to claim 4, wherein said integration means performs further integration when said judging means concludes that accuracy in distance measurement can be provided, said signal forming circuit outputs a distance signal corresponding to the time of said further integration after said further integration has been finished, and, when the judging means concludes that accuracy in distance measurement cannot be provided, the judging means outputs a plurality of distance signals on the basis of the integration output at the time of said judgment.

6. A distance measuring apparatus of the type which measures the distance to an object by projecting a distance measurement light to the object, receiving a reflection of said distance measurement light thus projected, and performing integration on a light reception signal corresponding to the reflection thus received, said distance measuring apparatus comprising:

(a) a judging means for making a judgment as to whether accuracy in distance measurement can be provided on the basis of an integration output from said integration means, and (c) a process circuit which obtains the distance through calculations for obtaining the distance on the basis of the output from said integration means when said judging means concludes that accuracy in distance measurement can be provided, and, obtains a plurality of distance signals through a process different from said calculations for obtaining the distance when said judging means concludes that accuracy in distance measurement cannot be provided.

7. A distance measuring apparatus according to claim 6, wherein said process circuit further performs the integration when the judging means concludes that the accuracy n distance measurement can be provided and obtains a distance on the basis of the time of a further integration.

8. A distance measuring apparatus of the type which measures the distance to an object by projecting a distance measurement light to the object, receiving a refection of said distance measurement light thus projected, and performing integration on a light reception signal corresponding to the reflection thus received, said distance measuring apparatus comprising:

(a) integration means for performing said integration on the light reception signal, (b) judging means for making a judgement as to whether accuracy n distance measurement can be provided on the basis of an integration output from said integration means, and (c) a signal processing circuit which processes said integration output when said judging means concludes that accuracy in distance measurement cannot be provided and obtains a plurality of distance signals according to the result of said processing.

* * * * *

UNITED STATES PATENT AND TRADEMARK OFFICE
CERTIFICATE OF CORRECTION

PATENT NO. : 5,148,011

DATED : September 15, 1992

INVENTOR(S) : HIDEO TAKA

Page 1 of 4

It is certified that error appears in the above-identified patent and that said Letters Patent is hereby corrected as shown below:

AT [57] ABSTRACT

Line 15, "intergration" should read --integration--.

COLUMN 1

Line 37, "IA, IB" should read --$I_A$, $I_B$--.
Line 39, "signal current IA, IB" should read --signal current $I_A$, $I_B$--.
Line 40, "IA, then, (IA+IB)," should read --$I_A$, then, ($I_A+I_B$),--.
Line 48, "V0" shuld read --$V_0$--.
Line 50, "V1;" should read --$V_1$;--.
Line 51, "V0" should read --$V_0$--.
Line 52, "V2." should read --$V_2$.--.
Line 56, "IA," should read --$I_A$,--.
Line 59, "(V1+k·IA·T)," should read --($V_1+k·I_A·T$),--.
Line 64, "(IA+IB)," should read --($I_A+I_B$),--.
Line 65, "V0" should read --$V_0$--.
Line 66, "V1." should read --$V_1$.--.

UNITED STATES PATENT AND TRADEMARK OFFICE
CERTIFICATE OF CORRECTION

PATENT NO. : 5,148,011
DATED : September 15, 1992
INVENTOR(S) : HIDEO TAKA

Page 2 of 4

It is certified that error appears in the above-identified patent and that said Letters Patent is hereby corrected as shown below:

COLUMN 2

Line 1, "k·IA·T=K(IA+IB)t" should read
--k·$I_A$·T=K($I_A$+$I_B$)t--.
Line 12, "V0" should read --$V_0$--.
Line 14, "V1." should read --$V_1$.--.
Line 15, "V2" should read --$V_2$-- and
"V1," should read --$V_1$,--.
Line 24, "V0" should read --$V_0$--.
Line 27, "{V1+(k·IA·T)-VN}" should read
--{$V_1$+(k·$I_A$·T)-$V_N$}--.
Line 28, "(V1+(k·IA·T))+VN}." should read
--{$V_1$+k·$I_A$·T)+$V_N$}.--.
Line 29, "V0+V1" should read --$V_0$ + $V_1$--.
Line 30, "t1 and t2," should read --$t_1$ and $t_2$,--.
Line 33, "VN" should read --$V_N$-- and
"(k·IA·T)," should read --(k·$I_A$·T),--.
Line 34, "t1" should read --$t_1$--.
Line 35, "t2" should read --$t_2$--.
Line 39, "VN" should read --$V_N$-- and
"(k·IA·T)," should read --(k·$I_A$·T),--.
Line 40, "t1" should read --$t_1$--.
Line 41, "t2" should read --$t_2$--.
Line 45, "V2" should read --$V_2$--.
Line 46, "V1." should read --$V_1$.--.
Line 47, "V0" should read --$V_0$--.
Line 48, "V2, VN" should read --$V_2$, $V_N$--.
Line 49, "(k·IA·T)," should read --(k·$I_A$·T),--.
Line 52, "V2" should read --$V_2$--.
Line 53, "V1," should read ead --$V_1$,--.
Line 56, "VN" should read --$V_N$-- and
"(k·IA·T)" should read (k·$I_A$·T)--.
Line 59, "(k·IA·T)" should read (k·$I_A$·T)--.
Line 64, "VN" should read --$V_N$--.

UNITED STATES PATENT AND TRADEMARK OFFICE
CERTIFICATE OF CORRECTION

PATENT NO. : 5,148,011
DATED : September 15, 1992
INVENTOR(S) : HIDEO TAKA

Page 3 of 4

It is certified that error appears in the above-identified patent and that said Letters Patent is hereby corrected as shown below:

COLUMN 4

Line 20, "ON" should read --ON--.
Line 21, "IA" should read --$I_A$--.
Line 22, "IB" should read --$I_B$--.
Line 23, "VC." should read --$V_C$.--.
Line 25, "IA and IB" should read --$I_A$ and $I_B$--.

COLUMN 5

Line 4, "KVC-VC," should read --KVC-$V_C$,-- and "IA and IB" should read --$I_A$ and $I_B$--.
Line 6, "IA" should read --$I_A$--.
Line 36, "VO" should read --$V_o$-- and "VC" should read --$V_c$--.
Line 46, "(V2-V1" should read --($V_2$-$V_1$--.
Line 48, "V2-V0" should read --$V_2$-$V_c$--.
Line 56, "VN." should read --$V_N$.--.
Line 62, "VO" should read --$V_o$--.
Line 66, "V2'," should read --$V_2$',--.
Line 67, "VN," should read --$V_N$,--.

COLUMN 6

Line 34, "(IA+IB)," should read --($I_A$+$I_B$),--.
Line 36, "(IA-IB)." should read --($I_A$-$I_B$).--.
Line 44, "VO" should read --$V_o$--.
Line 46, "(IA+IB) and (IA-IB)" should read --($I_A$+$I_B$) and ($I_A$-$I_B$)--.
Line 50, "VO'." should read --$V_o$'.--.
Line 51, "VO'," should read --$V_o$',--.
Line 54, "VO" should read --$V_o$--.
Line 68, "VO" should read --$V_o$--.

UNITED STATES PATENT AND TRADEMARK OFFICE
CERTIFICATE OF CORRECTION

PATENT NO. : 5,148,011
DATED : September 15, 1992
INVENTOR(S) : HIDEO TAKA

It is certified that error appears in the above-identified patent and that said Letters Patent is hereby corrected as shown below:

COLUMN 7

Line 3, "V0" should read --$V_0$--.
Line 12, "IA and IB" should read --$I_A$ and $I_B$--.
Line 25, "(V0)" should read --($V_0$)--.
Line 26, "V2," should read --$V_2$,--.
Line 31, "V2" should read --$V_2$--.
Line 39, "(V0)" should read --$V_0$--.
Line 44, "V2" should read --$V_2$--.

COLUMN 10

Line 1, "n" should read --in--.
Line 6, "refec-" should read --reflec- --.
Line 14, "n" should read --in--.

Signed and Sealed this

Thirtieth Day of November, 1993

Attest:

BRUCE LEHMAN

*Attesting Officer*  *Commissioner of Patents and Trademarks*